(12) United States Patent
De La Salle et al.

(10) Patent No.: US 6,718,943 B1
(45) Date of Patent: Apr. 13, 2004

(54) CONTROLLING UNDESIRED FORE AND AFT OSCILLATIONS OF A MOTOR VEHICLE

(75) Inventors: Stephen De La Salle, Basildon (GB); Dennis Light, Monroe, MI (US); Martin Jansz, Saffron Walden (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 121 days.

(21) Appl. No.: 10/018,207
(22) PCT Filed: Jun. 12, 2000
(86) PCT No.: PCT/GB00/02281
§ 371 (c)(1),
(2), (4) Date: Dec. 10, 2001
(87) PCT Pub. No.: WO00/77373
PCT Pub. Date: Dec. 21, 2000

(30) Foreign Application Priority Data

Jun. 11, 1999 (GB) .............................................. 9913518

(51) Int. Cl.$^7$ .............................. F02D 9/00; F02D 5/15
(52) U.S. Cl. .................. 123/406.24; 123/436; 123/399; 701/111
(58) Field of Search ........................ 123/406.24, 406.23, 123/399, 436; 701/111

(56) References Cited

U.S. PATENT DOCUMENTS

| | | | | |
|---|---|---|---|---|
| 5,025,380 A | * | 6/1991 | Wataya et al. ............... | 123/399 |
| 5,070,841 A | * | 12/1991 | Fujimoto et al. ....... | 123/406.46 |
| 5,452,698 A | * | 9/1995 | Denz et al. ............. | 123/406.24 |
| 5,615,654 A | * | 4/1997 | Weisman et al. ............ | 123/436 |
| 5,669,354 A | * | 9/1997 | Morris ................... | 123/406.24 |
| 5,681,239 A | * | 10/1997 | Toukura ................. | 123/406.51 |
| 6,067,489 A | * | 5/2000 | Letang et al. ................ | 123/436 |
| 6,343,586 B1 | * | 2/2002 | Muto et al. .................. | 123/399 |

* cited by examiner

Primary Examiner—Erick Solis
(74) Attorney, Agent, or Firm—Brinks Hofer Gilson & Lione

(57) ABSTRACT

In order to control vehicle shuffle, ie undesired fore and aft oscillations of the vehicle, the invention discloses a method comprising the steps of:

continuously sensing the speed of the vehicle motor and producing a signal representing the speed analysing the speed signal determining a mean value for the speed signal identifying fluctuations from the mean value filtering the signal to remove the mean value and to retain the fluctuations applying a phase change to the filtered signal applying a deadband such that signals below a predetermined magnitude are ignored amplifying the filtered and phase changed signal resulting from the deadband application, and supplying the filtered, phase changed and amplified signal to a controller which controls the torque output of the vehicle motor.

21 Claims, 3 Drawing Sheets

CONTROLLING UNDESIRED FORE AND AFT OSCILLATIONS OF A MOTOR VEHICLE

The present application claims priority to and incorporates by reference, in its entirety, PCT application no. PCT/GB00/02281, filed Jun. 12, 2000, which claims priority to Great Britain application no. 9913518.8, filed Jun. 11, 1999.

This invention relates to the controlling of undesired fore and aft oscillations of a motor vehicle.

When a motor vehicle is being driven, particularly with a manual transmission, there is a risk of undesired oscillations being produced in the drive train and transmitted to the vehicle, adversely affecting the comfort for the vehicle occupants. These oscillations affect comfort of the occupants within the vehicle, a factor often termed 'driveability'.

To deliver good driveability it is necessary to reduce driveline disturbances (which produce hesitations and oscillations in the vehicle fore-aft dynamic response) allowing the vehicle to pull away, accelerate, decelerate and drive smoothly; this makes the vehicle feel more stable and refined.

The occurrence of these undesired fore and aft oscillations in a motor vehicle is sometimes termed 'vehicle shuffle'. It is an object of this invention to control and reduce vehicle shuffle.

Proposals have been made to reduce vehicle shuffle, but none of these have completely solved the problem. Furthermore a less than satisfactory solution can result in exacerbating or bringing to the driver's notice the problem which might otherwise have remained unnoticed.

EP 0 802 317 describes a driveline damping system in which an engine speed is filtered to produce a derivative value. The derivative value is filtered again to remove values below a specified threshold, and the remaining signal is then subjected to amplification and then phase change to produce a signal which is fed to an engine ignition controller to reduce engine torque with the aim of dampening driveline oscillations.

Because the phase change takes place after the deadband filtering step and after the amplification step, the signal that is 'phase compensated' will no longer be representative of the fluctuations which cause the oscillations.

From a control system perspective, the problem can be formulated as a disturbance rejection—the disturbance being undesirable oscillations in motor/engine speed, torque and drive line speed and torque.

For a powertrain equipped with a mechanical throttle the engine torque response is open loop and is dominated by airflow response to throttle motion. The resulting change in engine torque will excite any oscillatory modes in the driveline, and external torque disturbances will have the same effect.

It is possible to shape the engine torque response in an open loop manner based on recognising and responding appropriately to the different classes of driver input demand. This can be thought of as working by reducing the energy spectrum of the engine torque into the driveline in that frequency range that includes the driveline modes. It has been found to be very effective on the heavier, faster manoeuvres.

According to the invention, there is provided a method of controlling undesired fore and aft oscillations of a motor vehicle by applying a torque control signal to a controller, the method comprising the steps of:

continuously sensing the speed of the vehicle motor and producing a signal representing the speed analysing the speed signal determining a mean value for the speed signal identifying fluctuations from the mean value filtering the signal to remove the mean value and to retain the fluctuations applying a phase change to the filtered signal such as to align the torque control signal with the identified fluctuations applying a deadband such that signals below a predetermined magnitude are ignored amplifying the filtered and phase changed signal resulting from the deadband application to provide said torque control signal, supplying torque control signal to the controller which controls the torque output of the vehicle motor.

All of these method steps can be implemented by software within an engine management system.

The software implementation of the method steps can be carried out in an engine management module of the vehicle.

The vehicle engine is preferably an internal combustion engine, in which case the torque output can be controlled by one or more of:

altering the spark timing altering the air flow altering the fuel flow.

The speed of the engine can be sensed from the change of crankshaft angle (delta crank angle interrupts).

The predetermined magnitude below which the deadband is established may be 5–10 rpm fluctuation from the mean rpm value.

A bias term may be applied to the control signal. Such a term reduces the power output of the engine by a predetermined amount, so that both advance and retard signals to the torque controller can be implemented.

The filtering step is carried out in two filtering stages; namely a first filtering stage which has the effect of removing 'constant acceleration' components of the signal, and a second filtering stage which has the effect of removing constant components of the signal.

The phase change can have a value between 50 and 70°, preferably 60° and enables good gain and phase margin properties to be achieved for the control loop.

The invention also extends to an engine management system for managing the operation of a combustion engine in a motor vehicle, which system is adapted to receive an engine speed signal and to output a torque control signal to an engine torque controller, the system comprising:

means for analysing the speed signal means for determining a mean value of the speed signal and for identifying fluctuations from the mean value filtering means for filtering the signal to remove the mean value and to retain the fluctuations means for applying a deadband such that signals below a predetermined magnitude are ignored means for applying a phase change to the filtered signal such as to align the torque control signal with the identified fluctuations amplification means for amplifying the filtered, and phase changed signal to provide said torque control signal, and means for supplying torque control signal to the engine torque controller to control the torque output of the vehicle engine.

The engine speed signal is preferably derived from an engine crank angle sensor.

Still further, the invention extends to a motor vehicle having an engine, an engine speed sensor, an engine torque controller and an engine management system as set forth above.

The invention will now be further described, by way of example, with reference to the accompanying drawings, in which.

Modern vehicle engines are equipped with sensors which sense a wide variety of engine parameters and pass corresponding signals to an engine management module in the form of an electronic processing unit. The module outputs signals to appropriate engine components so that, for example, the fuel/air mixture supplied to the engine cylinders is different according to the current, sensed engine temperature.

The processing power of the module can also be used to control undesired vehicle oscillations by receiving relevant signals from vehicle sensors, processing those signals and outputting to the engine commands which will at least reduce those oscillations.

The undesired vehicle oscillations occur when the engine speed oscillates between higher and lower speeds. We are not here concerned with why the engine speed oscillates or what causes it to oscillate; we are merely concerned with taking action to prevent that speed oscillation from being transferred to vehicle oscillations. In order to prevent engine speed oscillations from translating into vehicle oscillations, the method of the invention generates a signal to a torque controller which determines how much of the engine torque is transmitted to the vehicle drive train.

Figure 1:
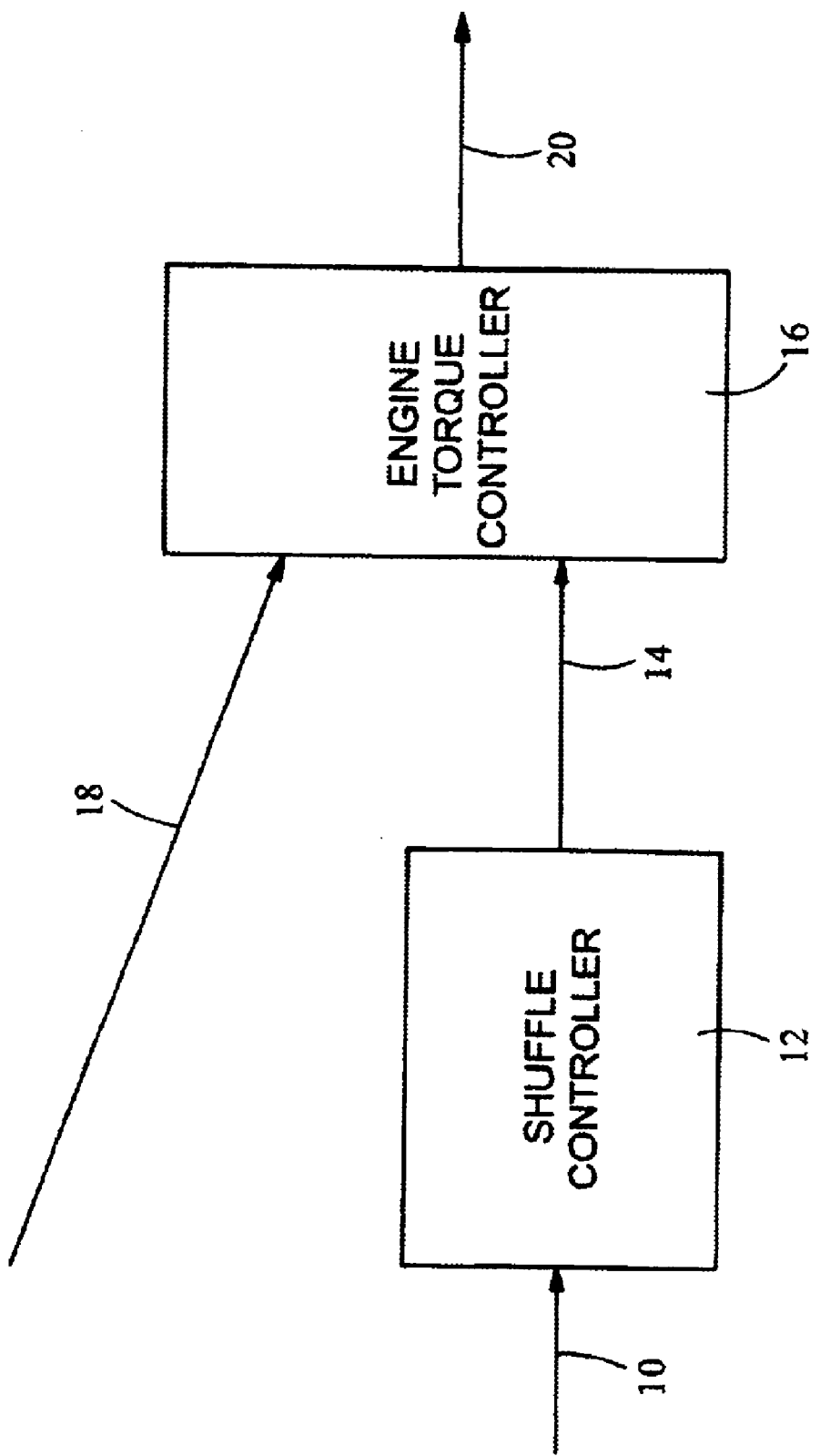
FIG. 1 is a schematic diagram illustrating the method of the invention.

FIG. 1 shows an engine speed signal 10 being passed to a shuffle controller 12. The controller 12 processes that signal in a manner which will be described with reference to FIG. 2, and outputs a torque request signal 14 to an engine torque controller 16 which determines how much of the torque developed by the engine at any one time will be passed through the vehicle driveline to the road wheels. The torque controller 16 also receives other torque requests (for example corresponding to the instantaneous accelerator pedal position) in the form of signals 18, and then selects the most appropriate desired engine torque level. The torque controller then generates signals 20 to the engine to vary the engine torque, e.g. by altering the spark timing, the air flow or the fuel flow (in petrol engines), by altering the fuel quantity (in diesel engines) or by altering the field winding or the current and voltage (in electric motors).

Figure 2:
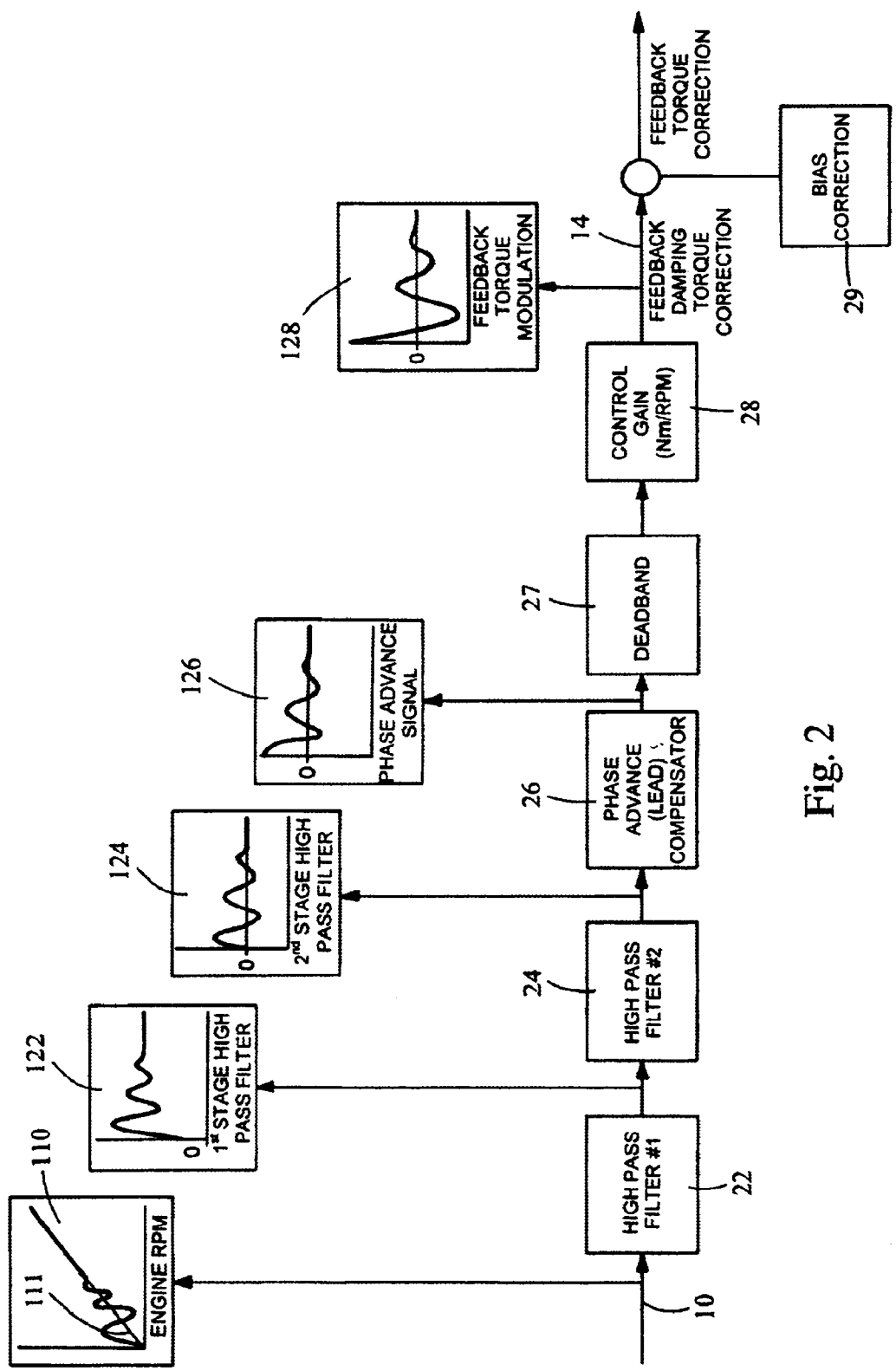
FIG. 2 is a schematic diagram illustrating inputs to and outputs from a torque controller.

FIG. 2 illustrates the steps performed by the shuffle controller 12.

First, the engine speed signal 10 is analysed to identify a mean engine speed, and any oscillations superimposed on that mean speed. In FIG. 2, a sample engine speed curve is shown at 110, representing an accelerating engine. Initially the speed fluctuates up and down about a mean speed indicated by a dotted line 111. The fluctuations reduce as the engine speeds up and eventually disappear as the engine speed increases.

In the first stage, the mean engine speed is identified and filter stages 22 and 24 filter that mean speed out of the engine speed signal.

The remaining engine speed signal, after the first filter stage, is shown by the curve at 122. This curve effectively isolates the engine speed fluctuations so that they can be handled separately from the mean engine speed. The first stage 22 produces a fluctuating signal which does not approach zero, but the second stage 24 brings the fluctuating signal to a zero base (see the curve at 124).

The next stage involves the application at 26 of a phase advance to the fluctuating signal. The phase advanced signal is shown at 126 and constitutes an advance of about 60° at the frequency of the dominant drive line oscillation. The position, in terms of frequency, of this peak is set in accordance with the parameters of the system in which it is installed. The purpose of advancing the signal in this way is to compensate for processing delays in the system and to correct for the dynamics of the system and so enable good gain margins (eg >5 dB) and phase margins (eg >60°) to be achieved in the control loop. One example of the dynamics which must be corrected is that of the engine speed calculation. The detection of two crankshaft position references required to calculate a speed takes a finite period of time and therefore the resulting speed calculation is inherently delayed when compared to actual crankshaft speed.

Once the signal has been filtered and phase changed, it must be amplified, using conventional signal amplification technology indicated at 28, to provide a useful signal level 128 as input to the torque controller 16.

The system is set up with a threshold level of fluctuation from the mean speed signal below which no output signal is sent to the torque controller. This is termed the deadband. When the fluctuation level is low (eg 5–10 rpm fluctuation from mean value), there is a risk that unavoidable noise in the system could produce an unintended (but probably insignificantly small) output signal. Such low fluctuations will lie in the deadband and thus will not be supplied to the torque controller.

The threshold level check can conveniently take place at 27, between the phase advance compensation and the amplification stages or, alternatively, after the amplification stage.

In addition, a bias term 29 can be applied to the torque request signal. The engine will have a nominal 'maximum brake torque' (MBT) which it can deliver. If the engine is operating at that level (and shuffle can occur at maximum torque), a call by the system for a torque increase to reduce shuffle could not be delivered by the engine. Accordingly the engine applies a bias to the MBT to reduce the nominal maximum engine torque by, say, 5%, thus allowing torque increase and a torque reductions called for by the system to be implemented to reduce shuffle. Once the event calling for a torque modification to reduce shuffle has passed, the bias will be gradually removed over a period of time, so that the normal MBT level is restored.

Alternatively, if other engine systems have already produced a retardation of MBT, then the bias can be applied in the opposite direction to increase the nominal torque to (normal) MBT to allow torque increases and torque reductions called for by the system to be implemented to reduce shuffle.

The system is continuously active in monitoring the speed signal all the time the engine is running. The system has no trigger which switches it on and off upon predetermined events such as driver operation of the accelerator pedal. The threshold level check takes place after filtering.

In normal operation, torque fluctuations above the deadband, calling for operation of the shuffle controller, are likely to occur up to 20–30% of the time during urban driving but only about 5% of the time during motorway driving.

Figure 3:
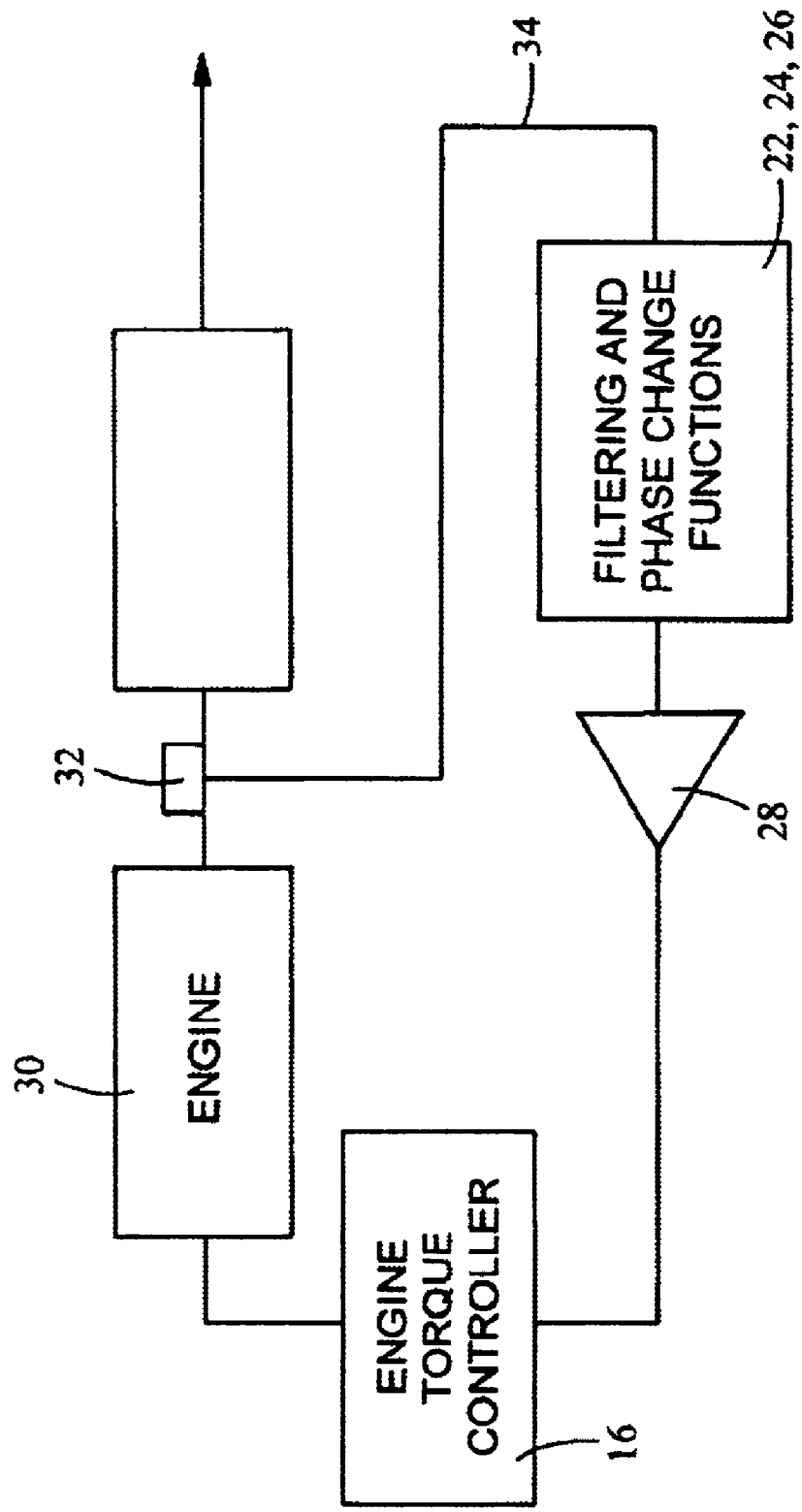
FIG. 3 is a block diagram showing a feedback path.

FIG. 3 illustrates how the system is active in providing a feedback loop to produce a modification in the vehicle speed in response to sensed engine speed fluctuations.

The engine of the vehicle is indicated at 30. A sensor 32 provides crankshaft positional information from which engine speed can be determined. Within the engine management module, the engine speed calculation is followed by the filtering and phase change functions 22,24,26. The resulting signal is amplified at 28 and passed to the torque controller 16 which sends a signal to the engine 30 to modify the engine torque and so dampen speed oscillations.

A feedback based algorithm is desirable as an open loop method will not provide any damping due to the drive line being excited by other unmeasurable or unsensed torque sources.

The feedback system described here uses sampled engine speed to create a torque modification term to the nominal response described above. In a gasoline engine, spark retard is typically used. In a diesel application, injected fuel quantity is used. In both cases, there are significant delays inherent to the speed sampling and torque production process.

In order to achieve the necessary control loop gain and phase margins, whilst ensuring satisfactory performance, the phase lead compensator 26 is used in addition to the gain 28 and selective filtering 22,24 described above. The lead parameters are chosen so that maximum phase advance of 60° occurs at the resonant peak. In one embodiment, the stability margins required for the system are specified as a phase margin of >60 degrees and a gain margin of >5 dB.

The system described has low gain at low frequency which implies minimal controller response. Around the resonant frequency, the system shows high loop gain implying active control i.e. provision of damping. The engine speed based design has good high frequency characteristics i.e. fast decrease in loop gain with frequency.

In order for the computer implementation of the control algorithms to produce the necessary fidelity without introducing significant delays, an appropriate execution rate must be determined from consideration of system and controller dynamics. Given the gear dependent range of resonant peaks between 2–8 Hz, a control system bandwidth of approximately 5–15 Hz is required. As processing power in an embedded engine management system (EMS) is a valuable asset it is important to correctly specify the optimum execution rate. The gasoline or diesel engine is an unusual control problem as factors such as sample and system delays are often dominated by engine rotation speed. Whilst it may make sense to execute the algorithm on a crank angle basis at a lower speed, this could require excessive microprocessor resource at higher speed. Alternatively, execution at a fixed execution time may be redundant at lower engine speed. A fixed rate of 16 mSec was selected as the best compromise.

Advantages of this system are good performance over a wide range of manoeuvres and ease of calibration.

In all the number of calibration terms (ie parameters specific to any particular vehicle) were reduced by approximately 30% compared to prior art systems. This is a significant improvement and is desirable both from the viewpoint of the calibration task as well as memory use.

The control system is calibrated in two phases. The first is based upon analysis of system models of vehicle behaviour. This proves an initial calibration. In the second phase, the initial calibration is refined based upon subjective ratings from in-vehicle drive appraisals.

Due to the non linear behaviour of the vehicle system, predominately lash related, subjective rating of drive is currently very important.

Tests of the system described showed significant improvement in drive ratings as vehicle shuffle was reduced. Crucially the absence of a triggering mechanism means that the algorithm is continually active, e.g. during gear changes—this was a criticism of previous production algorithm.

Some practical constraints on the system described are related to implementation of the scheme and concern compatibility with existing algorithms, CPU overhead and memory requirements and calibration implications.

In implementing this system within the existing control algorithm architecture of an existing engine management system, the management system was repartitioned to optimise software and microprocessor resources. Although it was necessary to execute the input processing and filter networks continually, much of the torque management algorithm were only executed when a torque management even was active. The result was that the new algorithm had minimal impact of microprocessor resource and was comparable to the previous implementation in terms of CPU overhead.

The method described satisfied system requirements including effectiveness in providing damping, consistency and robustness of that performance, algorithm compatibility with current architecture ease of calibration and robustness to noise effects. A key success of the algorithm is the fact that it is no longer relying on an explicit triggering mechanism to signal driver intent.

What is claimed is:

1. A method of controlling undesired fore and aft oscillations of a motor vehicle, the method comprising the steps of:
   continuously sensing the speed of the vehicle motor and producing a speed signal representing the speed;
   analysing the speed signal;
   determining a mean value for the speed signal;
   identifying fluctuations from the mean value;
   filtering the signal to remove the mean value and to retain the fluctuations;
   applying a phase change to the filtered signal;
   applying a deadband such that signals below a predetermined magnitude are ignored;
   amplifying the filtered and phase changed signal resulting from the deadband application to provide the torque control signal, and
   supplying the torque control signal to the controller which controls the torque output of the vehicle motor.

2. A method as claimed in claim 1, wherein the vehicle motor is an internal combustion engine.

3. A method as claimed in claim 1, wherein the method steps are implemented by software within an engine management system.

4. A method as claimed in claim 3, wherein the software implementation of the method steps is carried out in an engine management module of the vehicle.

5. A method as claimed in claim 1, wherein the speed of the engine is sensed from the change of crankshaft angle (delta crank angle interrupts).

6. A method as claimed in claim 1, wherein the torque output is controlled by one or more of:
   altering the spark timing;
   altering the air flow; and
   altering the fuel flow.

7. A method as claimed in claim 1, wherein the predetermined magnitude below which the deadband is established is 5–10 rpm fluctuation from the mean rpm value.

8. A method as claimed in claim 1, wherein a bias term is applied to the control signal to reduce the available maximum brake torque of the engine by a predetermined amount.

9. A method as claimed in claim 1, wherein the filtering step is carried out in two filtering stages.

10. A method as claimed in claim 9, wherein the first filtering stage removes 'constant acceleration' components of the signal.

11. A method as claimed in claim 9, wherein the second filtering stage removes constant components of the signal.

12. A method as claimed in claim 1, wherein the phase change is between 50 and 70°.

13. A method as claimed in claim 1, wherein the signal level is monitored and if the level is below a threshold value, no signal is supplied to the controller.

14. An engine management system for a motor vehicle, which system is adapted to receive an engine speed signal from an engine speed sensor and to output a torque control signal to an engine torque controller, the system comprising:

means for analysing the speed signal;

means for determining a mean value of the speed signal and for identifying fluctuations from the mean value;

filtering means for filtering the signal to remove the mean value and to retain the fluctuations;

means for applying a phase change to the filtered signal such as to align the torque control signal with the identified fluctuations;

means for applying a deadband such that signals below a predetermined magnitude are ignored;

amplification means for amplifying the filtered and phase changed signal to provide the torque control signal, and means for supplying the torque control signal to the engine torque controller to control the torque output of the vehicle engine.

15. An engine management system as claimed in claim 14, wherein the engine is an internal combustion engine.

16. An engine management system as claimed in claim 14, including means for controlling one of the spark timing;

the air flow; and the fuel flow, to control the engine torque.

17. An engine management system as claimed in claim 14, wherein a bias term is applied to the control signal to reduce the available maximum brake torque of the engine by a predetermined amount.

18. An engine management systems as claimed in claim 14, wherein two filtering stages are provided to filter the signal.

19. An engine management systems as claimed in claim 18, wherein the first filtering stage is adapted to remove 'constant acceleration' components of the signal.

20. An engine management systems as claimed in claim 18, wherein the second filtering stage is adapted to remove constant components of the signal.

21. A motor vehicle having an engine, an engine speed sensor, an engine torque controller and an engine management system as claimed in claim 14.

* * * * *